US012787090B2

(12) United States Patent
Qiu et al.

(10) Patent No.: US 12,787,090 B2
(45) Date of Patent: Nov. 3, 2026

(54) NETWORK NODES, COMMUNICATION SYSTEM AND METHODS FOR HANDLING SECONDARY CELL GROUP OPERATION MODE IN A WIRELESS COMMUNICATION NETWORK

(71) Applicant: Telefonaktiebolaget LM Ericsson (publ), Stockholm (SE)

(72) Inventors: Liwei Qiu, Täby (SE); Stefan Wager, Espoo (FI); Cecilia Eklöf, Täby (SE); Jens Bergqvist, Linköping (SE); Icaro Leonardo Da Silva, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 245 days.

(21) Appl. No.: 18/556,372

(22) PCT Filed: May 5, 2022

(86) PCT No.: PCT/SE2022/050437
§ 371 (c)(1),
(2) Date: Oct. 20, 2023

(87) PCT Pub. No.: WO2022/235193
PCT Pub. Date: Nov. 10, 2022

(65) Prior Publication Data

US 2024/0188159 A1 Jun. 6, 2024

Related U.S. Application Data

(60) Provisional application No. 63/184,914, filed on May 6, 2021.

(51) Int. Cl.
*H04W 76/15* (2018.01)
*H04W 52/02* (2009.01)
*H04W 36/00* (2009.01)

(52) U.S. Cl.
CPC ....... *H04W 76/15* (2018.02); *H04W 52/0206* (2013.01); *H04W 36/00698* (2023.05)

(58) Field of Classification Search
CPC ........................ H04W 36/00698; H04W 76/15
See application file for complete search history.

(56) References Cited

U.S. PATENT DOCUMENTS

| | | | | |
|---|---|---|---|---|
| 12,262,380 | B2 * | 3/2025 | Yao | H04W 72/20 |
| 2021/0084543 | A1 * | 3/2021 | Wang | H04W 76/16 |
| 2024/0147332 | A1 * | 5/2024 | Zhang | H04W 36/04 |

FOREIGN PATENT DOCUMENTS

| | | |
|---|---|---|
| JP | 2021503222 A | 2/2021 |

OTHER PUBLICATIONS

"Summary of AI-activation of deactivated SCG" by ZTE, hereafter referred as ZTE. (Year: 2021).*

(Continued)

*Primary Examiner* — Pamit Kaur
(74) *Attorney, Agent, or Firm* — Murphy, Bilak & Homiller, PLLC

(57) ABSTRACT

A first network node and method therein for handling an operation mode change of a second network node for a communication device in a wireless communication network are disclosed. The communication device is configured with multi-radio dual connectivity (MR-DC) with the first network node having a first cell group and the second network node having a second cell group. The first network node receives (913) a request from the second network node for a change of operation mode and/or a change of configuration of the second network node and determines (914) whether to accept or reject the request for the change of the operation mode and/or a change of configuration. The first network node transmits (915) to the communication device a message including a reconfiguration or command to change the second cell group configuration and/or the opera- (Continued)

tion mode of the second cell group, if it is determined that the change of operation mode of the second cell group and/or change of the second cell group configuration is accepted; or transmits (917) a response to the second network node with an indication indicating a rejection reason, if it is determined to reject the request for the change of the operation mode.

20 Claims, 10 Drawing Sheets

(56) References Cited

OTHER PUBLICATIONS

3GPP, "3GPP TS 37.340 V16.5.0", 3rd Generation Partnership Project; Technical Specification Group Radio Access Network; Evolved Universal Terrestrial Radio Access (E-UTRA) and NR; Multi-connectivity; Stage 2 (Release 16), Mar. 2021, 1-84.

3GPP, "3rd Generation Partnership Project; Technical Specification Group Radio Access Network; NR; Radio Resource Control (RRC) protocol specification (Release 16)", 3GPP TS 38.331 V16.4.1, Mar. 2021, 1-949.

China Telecom, "Views on NR Rel-17", 3GPP TSG RAN Meeting #84, RP-190919, Newport Beach, USA, Jun. 4, 2019, 1-36.

Ericsson, "Support of SCG activation/de-activation", 3GPP TSG-RAN WG3 #111-e, R3-210403, Jan. 25-Feb. 4, 2021, 1-6.

ETSI MCC, "Report of 3GPP TSG RAN WG2 meeting #113bis-e, Online", 3GPP TSG-RAN WG2 meeting #114-2, R2-2104xxx, Apr. 12-20, 2021, 1-279.

Lenovo, et al., "Summary of offline discussion on SCG activation and deactivation", 3GPP TSG-RAN WG3 #112e, R3-212784, Online, May 17-27, 2021, 1-37.

Qualcomm Incorporated, "Signaling support for SCG deactivation/activation", 3GPP TSG-RAN WG3 Meeting #111-e, R3-210352, E-meeting, Jan. 25-Feb. 5, 2021, 1-5.

Vice Chairman (Nokia), "Report on LTE legacy, Mobility, DCCA, Multi-SIM and RAN slicing", 3GPP TSG-RAN WG2 Meeting #113 bis electronic, R2-2104301, Online, Apr. 12-Apr. 20, 2021, 1-38.

ZTE Corporation, "Summary of AI 8.2.2.3—Activation of deactivated SCG", 3GPP TSG RAN WG2 Meeting #113bis-e, R2-2104317, E-Conference, Apr. 12-20, 2021, 1-15.

* cited by examiner

NETWORK NODES, COMMUNICATION SYSTEM AND METHODS FOR HANDLING SECONDARY CELL GROUP OPERATION MODE IN A WIRELESS COMMUNICATION NETWORK

TECHNICAL FIELD

Embodiments herein relate to network nodes and methods therein. In particular, they relate to handling operation mode for a communication device operating in dual connectivity with a master cell group (MCG) and a secondary cell group (SCG) in a wireless communication network.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a "NodeB" or "eNodeB" or "gNB". A service area or cell area is a geographical area where radio coverage is provided by the radio network node. The radio network node communicates over an air interface operating on radio frequencies with the wireless communication device within a range of the radio network node.

A Universal Mobile Telecommunications System (UMTS) is a third generation (3G) telecommunication network, which evolved from the second generation (2G) Global System for Mobile Communications (GSM). Specifications for the Evolved Packet System (EPS), also called a Fourth Generation (4G) network or Long Term Evolution (LTE) have been completed within the 3rd Generation Partnership Project (3GPP) and this work continues in the coming 3GPP releases, for example to specify a Fifth Generation (5G) New Radio (NR) network and upcoming releases.

In 3GPP Rel-12, the LTE feature Dual Connectivity (DC) was introduced, to enable the UE to be connected in two cell groups, each controlled by an LTE access node, eNBs, labelled as the Master eNB (MeNB) and the Secondary eNB (SeNB). The UE still only has one RRC connection with the network node. In 3GPP, the Dual Connectivity (DC) solution has since then been evolved and is now also specified for NR as well as between LTE and NR. With introduction of 5G, the term Multi-Radio Dual Connectivity (MR-DC), see also 3GPP TS 37.340, was defined as a generic term for all dual connectivity options which includes at least one NR access node. Using the MR-DC generalized terminology, the UE is connected in a Master Cell Group (MCG), controlled by the Master Node (MN), and in a Secondary Cell Group (SCG) controlled by a Secondary Node (SN).

Further, in MR-DC, when dual connectivity is configured for the UE, within each of the two cell groups, MCG and SCG, carrier aggregation may be used as well. In this case, within the MCG, controlled by the master node (MN), the UE may use one PCell and one or more SCell(s). And within the SCG, controlled by the secondary node (SN), the UE may use one Primary SCell (PSCell), also known as the primary SCG cell in NR, and one or more SCell(s). This combined case, i.e. dual connectivity combined with carrier aggregation in MR-DC, is illustrated in FIG. 1, where a MN 110, a SN 120, a UE 130, MCG 140, SCG 150, a PCell 160 in MCG 140, a PSCell 170 in the SCG 150, and multiple SCells are shown. In NR, the primary cell of a master or secondary cell group is sometimes also referred to as the Special Cell (SpCell). Hence, the SpCell in the MCG is the PCell and the SpCell in the SCG is the PSCell.

There are different ways to deploy 5G network with or without interworking with LTE, also referred to as E-UTRA and evolved packet core (EPC). In principle, NR and LTE can be deployed without any interworking, denoted by NR stand-alone (SA) operation, also known as Option 2, that is gNB in NR can be connected to 5G core network (5GC) and eNB in LTE can be connected to EPC with no interconnection between the two, also known as Option 1.

On the other hand, the first supported version of NR uses dual connectivity, denoted as EN-DC (E-UTRAN-NR Dual Connectivity), also known as Option 3, as depicted in FIG. 2. In such a deployment, dual connectivity between NR and LTE is applied, where a UE 210 is connected both to an LTE access node LTE MeNB 220 with the LTE radio interface LTE Uu 221 and to an NR access node NR SgNB 230 with the NR radio interface NR Uu 231. Further, in EN-DC, the LTE access node acts as the master node, in this case known as the Master eNB (MeNB), controlling the master cell group (MCG), and the NR access node acts as the secondary node, in this case sometimes also known as the Secondary gNB (SgNB), controlling the secondary cell group (SCG). The SgNB may not have a control plane connection to the core network EPC 240 which instead is provided by MeNB and in this case the NR. This is also called as "Non-standalone NR" or, in short, "NSA NR". Notice that in this case the functionality of an NR cell is limited and would be used for connected mode UEs as a booster and/or diversity leg, but an UE in RRC_IDLE state in which the UE is switched on but does not have any established RRC connection, cannot camp on these NR cells.

With introduction of 5GC, other options may be also valid. As mentioned above, option 2 supports stand-alone NR deployment where gNB is connected to 5GC. Similarly, LTE can also be connected to 5GC using option 5, also known as eLTE, E-UTRA/5GC, or LTE/5GC and the node can be referred to as an ng-eNB. In these cases, both NR and LTE are seen as part of the NG-RAN and both the ng-eNB and the gNB can be referred to as NG-RAN nodes.

It is worth noting that, there are also other variants of dual connectivity between LTE and NR which have been standardized as part of NG-RAN connected to 5GC. Under the MR-DC umbrella, we have:

- EN-DC (Option 3): LTE is the master node and NR is the secondary node (EPC CN employed, as depicted in FIG. 2).
- NE-DC (Option 4): NR is the master node and LTE is the secondary (5GCN employed).
- NGEN-DC (Option 7): LTE is the master node and NR is the secondary (5GCN employed).
- NR-DC (variant of Option 2): Dual connectivity where both the master node (MN) controlling the MCG, and the secondary node (SN) controlling the SCG, are NR 5GCN employed, as depicted in FIG. 3.

As migration for these options may differ from different operators, it is possible to have deployments with multiple options in parallel in the same network e.g. there could be eNB base station supporting option 3, 5 and 7 in the same network as NR base station supporting 2 and 4. In combination with dual connectivity solutions between LTE and NR it is also possible to support CA (Carrier Aggregation) in each cell group, i.e. MCG and SCG and dual connectivity between nodes on same RAT, e.g. NR-NR DC. For the LTE cells, a consequence of these different deployments is the co-existence of LTE cells associated to eNBs connected to EPC, 5GC or both EPC and 5GC.

As said earlier, DC is standardized for both LTE and E-UTRA-NR DC (EN-DC).

LTE DC and EN-DC are designed differently when it comes to which nodes control what. Basically, there are two options:

1) Centralized solution, like LTE-DC,

2) Decentralized solution, like EN-DC.

FIG. 4 shows the schematic control plane architecture looks like for LTE DC, EN-DC and NR-DC. The main difference here is that in EN-DC and NR-DC, the SN has a separate NR RRC entity. This means that the SN can control the UE also; sometimes without the knowledge of the MN but often the SN need to coordinate with the MN. In LTE-DC, the RRC decisions are always coming from the MN, i.e. MN to UE. Note however, the SN still decides the configuration of the SN, since it is only the SN itself that has knowledge of what kind of resources, capabilities etc. it has.

For EN-DC and NR-DC, the major changes compared to LTE DC are:

- The introduction of split data radio bearer (DRB) from the SN (known as SN terminated split DRB).
- The introduction of split signaling radio bearer (SRB) for RRC.
- The introduction of a direct SRB from the SN (also referred to as SCG SRB or SRB3).

FIG. 5 shows, from network node perspective, the user plane protocol architecture in MR-DC with EPC (EN-DC). In this case, the network node can configure either E-UTRA Packet Data Convergence Protocol (PDCP) or NR PDCP for MN terminated MCG DRBs while NR PDCP is always used for all other DRBs.

FIG. 6 shows, from network node perspective, the user plane protocol architecture in MR-DC with 5GC (NGEN-DC, NE-DC and NR-DC). In MR-DC with 5GC, NR PDCP is always used for all Data Radio Bearer (DRB) types. In NGEN-DC, E-UTRA Radio Link Control/Medium Access Control (RLC/MAC) is used in the MN while NR RLC/MAC is used in the SN. In NE-DC, NR RLC/MAC is used in the MN while E-UTRA RLC/MAC is used in the SN. In NR-DC, NR RLC/MAC is used in both MN and SN.

SCG Power Saving Mode:

In order to improve network energy efficiency and UE battery life for UEs in MR-DC, a Rel-17 work item is planned to introduce efficient SCG/SCell activation/deactivation. This can be especially important for MR-DC configurations with NR SCG, as it has been evaluated in 3GPP contribution document RP-190919 that in some cases NR UE power consumption is 3 to 4 times higher than LTE.

3GPP has specified the concepts of dormant SCell (in LTE) and dormancy like behavior of an SCell (for NR).

In LTE, when an SCell is in dormant state, like in the deactivate state, the UE does not need to monitor the corresponding Physical Downlink Control Channel (PDCCH) or PDSCH and cannot transmit in the corresponding uplink. However, differently from deactivated state, the UE is required to perform and report Channel Quality Indicator (CQI) measurements. A PUCCH SCell, i.e. SCell configured with PUCCH, cannot be in dormant state.

In NR, dormancy like behaviour for SCells is realized using the concept of dormant Bandwidth Parts (BWPs). See FIG. 7, an Illustration of dormancy like behavior for SCells in NR. One dormant BWP, which is one of the dedicated BWPs configured by the network node via RRC signaling, can be configured for an SCell. If the active BWP of the activated SCell is a dormant BWP, the UE stops monitoring PDCCH on the SCell but continues performing Channel State Information (CSI) measurements, Automatic Gain Control (AGC) and beam management, if configured. A Downlink Control Information (DCI) is used to control entering/leaving the dormant BWP for one or more SCell(s) or one or more SCell group(s), and it is sent to the special cell (SpCell) of the cell group that the SCell belongs to, i.e. PCell in case the SCell belongs to the MCG and PSCell if the SCell belongs to the SCG. The SpCell, i.e. PCell of PSCell, and PUCCH SCell cannot be configured with a dormant BWP.

However, only SCells can be put in dormant state (in LTE) or operate in dormancy like behavior (NR). Also, only SCells can be put into the deactivated state in both LTE and NR. Thus, if the UE is configured with MR-DC, it is not possible to fully benefit from the power saving options of dormant state or dormancy like behavior as the PSCell cannot be configured with that feature. Instead, an existing solution could be releasing for power savings and adding when traffic demands requires the SCG on a need basis. However, traffic is likely to be bursty, and adding and releasing the SCG involves a significant amount of RRC signaling and inter-node messaging between the MN and the SN, which causes considerable delay.

In 3GPP rel-16, some discussions were made regarding putting also the PSCell in dormancy, also referred to as SCG Suspension. In RAN-2 108, further discussion was made to clarify the further studies (FFSs). Some solutions have been proposed in Rel-16, but these have different problems.

RAN2#113bis-e has the following agreements for the Deactivation of SCG.

| Agreements | |
|---|---|
| 5 | Only the MN can generate an RRC message with SCG (de)activation. |
| 1 | Indication of SCG deactivation to the UE via the SCG is not supported. |
| 7 | During handover preparation, the target MN can indicate the SCG state in the RRCReconfiguration message to be sent to the UE by the source MN. |
| 8 | The MN RRC reconfiguration message used to deactivate SCG and the embedded SN RRC reconfiguration message can reconfigure any parameter (any restriction requires an explicit decision). |
| 9 | While the SCG is deactivated, the MN RRC reconfiguration message and the embedded SN RRC reconfiguration message can reconfigure any parameter (any restriction requires an explicit decision). |
| 2 | The UE can indicate to the MN that the UE would like the SCG to be deactivated. FFS on the details (e.g. reusing UAI or existing messages, information included, etc.). Network can configure whether UE is allowed to do the indication |

In the following, the terms "suspended SCG", "SCG in power saving mode", "SCG deactivated state", or "deactivated SCG" are used interchangeably. The term "suspended SCG" may also be called as "deactivated SCG or inactive SCG", or "dormant SCG". The terms "resumed SCG", "SCG in normal operating mode", "SCG activated state" and "SCG in non-power saving mode" are used interchangeably. The terms "resumed SCG" may also be called as "activated SCG" or "active SCG". The operation of the SCG operating in resumed or active mode may also be called as normal SCG operation or legacy SCG operation. Examples of operations are UE signal reception/transmission procedures e.g. reception of signals messages, transmission of signals messages, etc. The terms "communication device" and "UE" are used interchangeably. The term "network node", "gNB", "eNB", "gNodeB are used interchangeably.

SUMMARY

As part of developing embodiments herein problems were identified and will first be discussed.

The change of SCG mode of operation can either be initiated by the SN, i.e. SN-initiated, or by the MN, i.e. MN-initiated.

SN-Initiated Change: MN can Reject and/or Accept

When the change for SCG mode of operation is initiated by the SN, the MN may need to decide whether the request is accepted or rejected. However, especially in the case the request is rejected, the SN would not be aware of the reason for the rejection. One issue is that relevant input to the SCG activation/deactivation decision for rejecting an SN-initiated request at the MN may come from the UE. This may be for instance information that the UE overheating or that UE is low on battery. This information is typically transmitted to the MN, as part of UE assistance information procedure, and is not available to the SN. Not knowing the rejection could prevent the SN to take follow up actions e.g. decide to release the SCG and/or to wait some time before it can send another request. For example, let us assume the SCG is deactivated. And, the MN becomes aware, e.g. via UE assistance, that UE is overheating. If SN requests the activation of the SCG, the MN rejects the request from the SN to activate the SCG, but the SN would not be aware of the reason.

MN-Initiated Change: SN can Reject and/or Accept

When the change for SCG mode of operation is initiated by the MN e.g. due to some internal algorithm at the MN, this time is the SN that may need to decide whether the request is accepted or rejected. However, especially in the case the request is rejected, the MN would not be aware of the reason for the rejection, which might be something internal at the SN and/or related to the SCG configuration. One issue is that relevant input to the SCG activation/deactivation decision for rejecting an MN-initiated request at the SN may come from the UE via SRB3 e.g. UE Assistance Information via SRB3. This may be for instance information that the UE overheating or that UE is low on battery. If over SRB3, this information is transmitted to the SN, as part of UE assistance information procedure, and is not available to the MN. Not knowing the rejection could prevent the MN to take follow up actions e.g. decide to release the SCG and/or to wait some time before it can send another request.

Therefore, it is an object of embodiments herein to provide an improved method for handling SCG operation mode change in a wireless communication network.

According to one aspect of the embodiments herein, the object is achieved by a first network node e.g. MN and method therein for handling SCG mode of operation by providing a rejection reason to a second network node e.g. the SN. The rejection reason may be, e.g. a cause value, to reject a request for change of an SCG mode for a UE. The first network node may transmit information enabling the second network node to determine an SCG mode of operation e.g. an ACTIVITY NOTIFICATION message to the second network node.

The first network node receives a request from the second network node for change of mode of operation of the SCG.

The first network node transmits a response to the second network node, where the change of the SCG mode of operation is accepted or rejected.

If the change of the SCG mode of operation is rejected, the response including an indication of a specific reason for rejection.

If the change of the SCG mode of operation is accepted, the first network node transmits to the communication device a message including a reconfiguration or command to change the SCG operation mode.

According to one aspect of the embodiments herein, the object is achieved by a second network node e.g. SN and method therein for handling SCG mode of operation by requesting a change of SCG operation mode to a first network node e.g. MN.

The second network node may receive information enabling the second network node to determine the SCG mode of operation e.g. an ACTIVITY NOTIFICATION message received by the second network node.

The second network node transmits a request to the first network node for change of SCG operation mode.

The second network node receives a response from the first network node, where the change of the SCG operation mode may be accepted or rejected by the first network node.

If the change of the SCG operation mode is rejected, the response from the first network node including an indication of a reason for rejection.

According to some embodiments herein, the first network node may be operating as a Master Node (MN) for a UE configured with MR-DC with a master cell group (MCG) and a secondary cell group (SCG). The request for change of SCG operation mode may be an SN-initiated request that may be rejected by the MN.

According to some embodiments herein, the second network node may be operating as a Secondary Node (SN) for a UE configured with MR-DC. The request for change of SCG operation mode may be an SN-initiated request that may be rejected by the MN.

According to some embodiments herein, the first network node may be operating as a Secondary Node (SN) for a UE configured with MR-DC. The request for change of SCG operation mode may be an MN-initiated request that may be rejected by the SN.

According to some embodiments herein, the second network node may be operating as a Master Node (MN) for a UE configured with MR-DC. The request for change of SCG operation mode may be an MN-initiated request that can be rejected by the SN.

In other words, according to the embodiments herein, the MN informs the SN of the detailed reason when rejects the request on SCG (de)activation. The SN informs the MN of the detailed reason when rejects the request on SCG (de) activation.

Advantages of embodiments herein are:

To help the SN to understand the reason for rejection of SCG (de)activation, and be well prepared for its own resource allocation.

To enable the SN to take further actions depending on the exact cause value e.g. release the SCG resources etc.

Similar benefits exist for the MN case.

The reject reason is important for the SN to take decision on possible further actions, e.g. whether or when to request the change for SCG mode of operation again and/or to release the SCG and/or to change the PSCell. For instance, if the reason for the reject of SCG activation is UE overheating, then the SN should wait before sending the activation request again. On the other hand, if the reason for reject of SCG deactivation is that MN expects more data, then SN can resend the deactivation request once the data is transmitted.

Therefor embodiments herein provide an improved method for handling SCG mode of operation for a communication device operating in dual connectivity with a master cell group (MCG) and a secondary cell group (SCG) of a network node in a wireless communication network.

BRIEF DESCRIPTION OF THE DRAWINGS

Examples of embodiments herein are described in more detail with reference to attached drawings in which.

DETAILED DESCRIPTION

Figure 8:
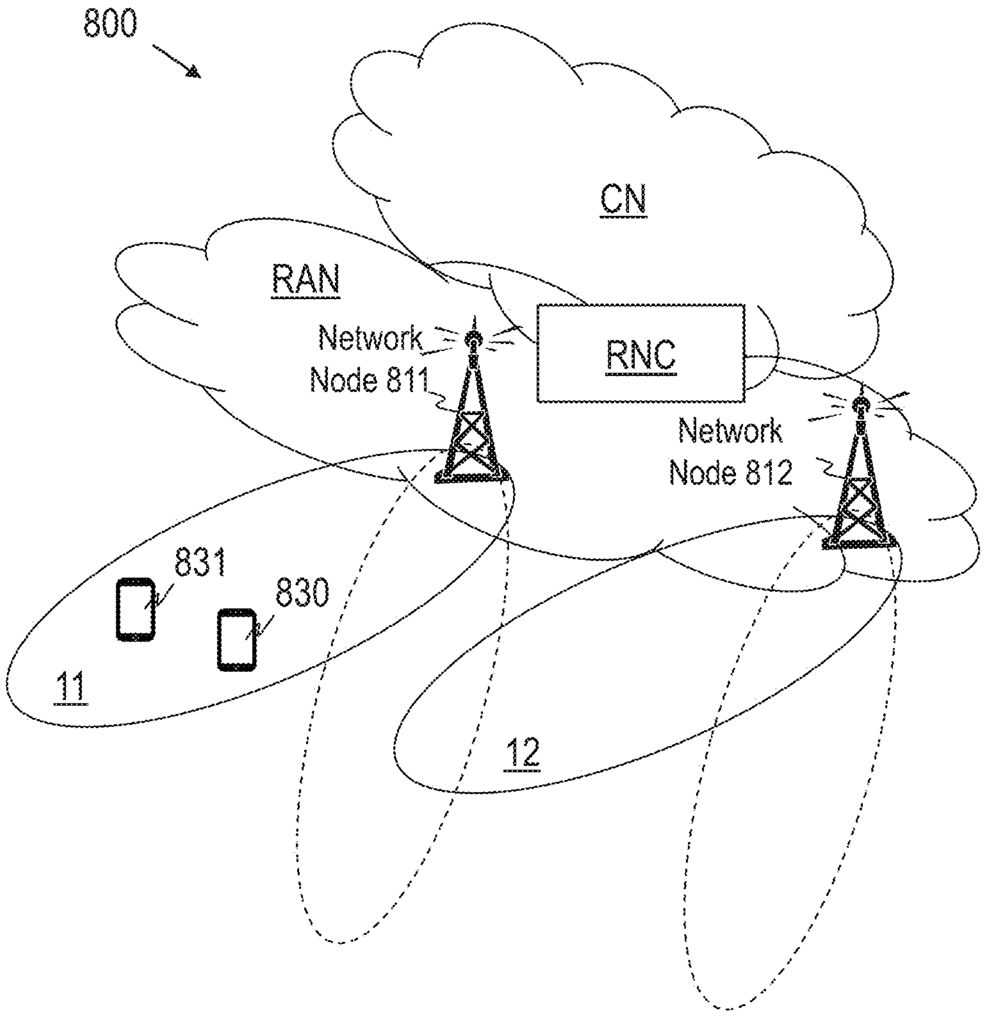
FIG. 8 is a schematic block diagram illustrating a wireless communication network.

Embodiments herein relate to communications networks in general. FIG. 8 is a schematic overview depicting a communication network 800. The communication network 800 may be a wireless communications network comprising one or more RANs, and one or more CNs. The communication network 800 may use a number of different technologies, such as Wi-Fi, Long Term Evolution (LTE), LTE-Advanced, NR, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

In the wireless communication network 800, one or more wireless communication devices 830, 831 such as a UE, a mobile station or a wireless terminals communicates via one or more Radio Access Networks (RAN) to one or more core networks (CN). It should be understood by the skilled in the art that "wireless communication device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

Network nodes operate in the wireless communication network 800 such as a first network node 811 and a second network node 812. The first and second network node 811, 812 may be any of RAN node, such as gNB, eNB, en-gNB, ng-eNB, gNB etc. The first network node 811 provides radio coverage over a geographical area, a service area 11, which may also be referred to as a beam or a beam group where the group of beams is covering the service area of a first radio access technology (RAT), such as 5G, LTE, Wi-Fi or similar. The second network node 812 provides radio coverage over a geographical area, a service area 12, which may also be referred to as a beam or a beam group where the group of beams is covering the service area of a first or a second radio access technology (RAT), such as 5G, LTE, Wi-Fi or similar. It should be noted that a network node may be a RAN node, a CN node or an OAM node.

The first and second network nodes 811 and 812 may be a transmission and reception point e.g. a radio access network node such as a Wireless Local Area Network (WLAN) access point or an Access Point Station (AP STA), an access controller, a base station, e.g. a radio base station such as a NodeB, a gNB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless communication device within the service area served by the respective first and second network nodes 811 and 812 depending e.g. on the radio access technology and terminology used. The first and second network nodes 811 and 812 may be referred to as a source and target network node, respectively, and may communicate with the wireless communication device 830, 831 with Downlink (DL) transmissions to the wireless communication device 830, 831 and Uplink (UL) transmissions from the wireless communication device 830, 831.

Figure 1:
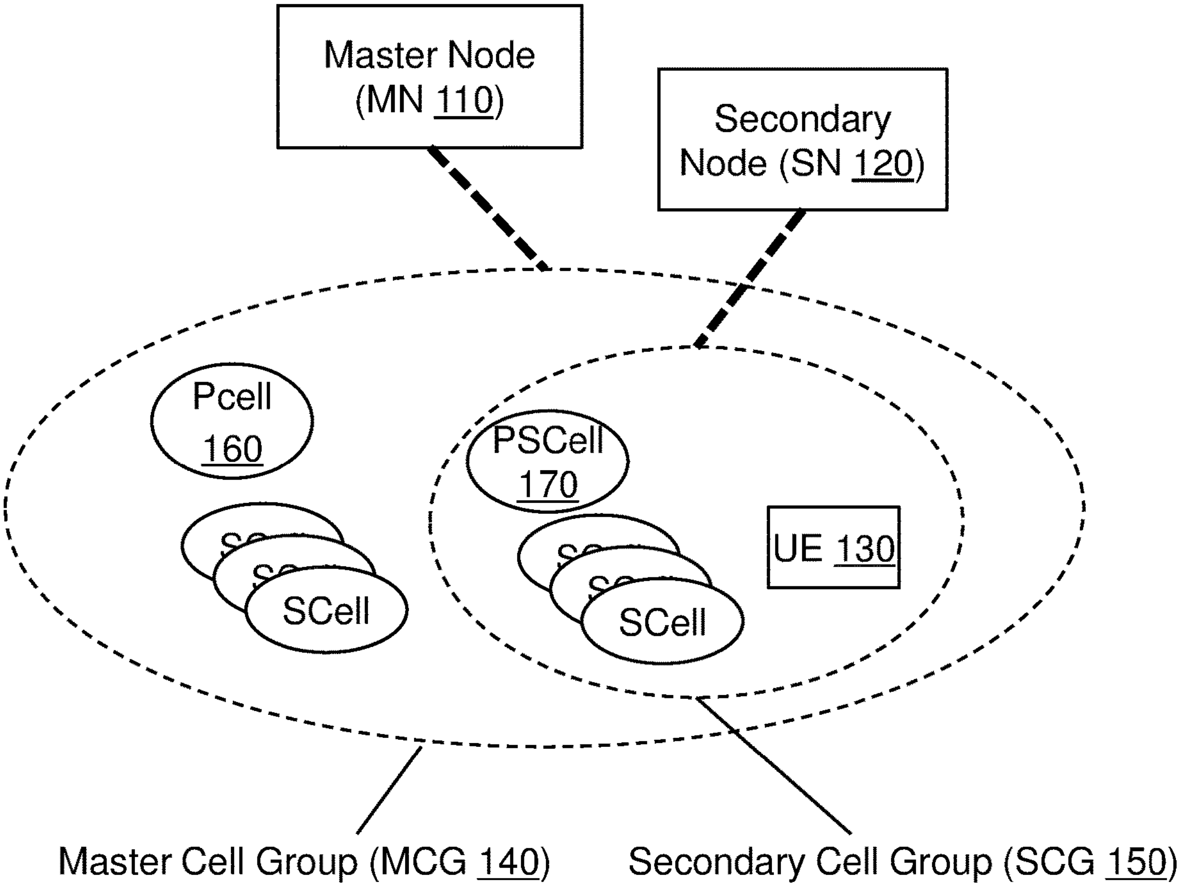
FIG. 1 is a schematic block diagram illustrating dual connectivity combined with carrier aggregation in MR-DC.
Figure 2:
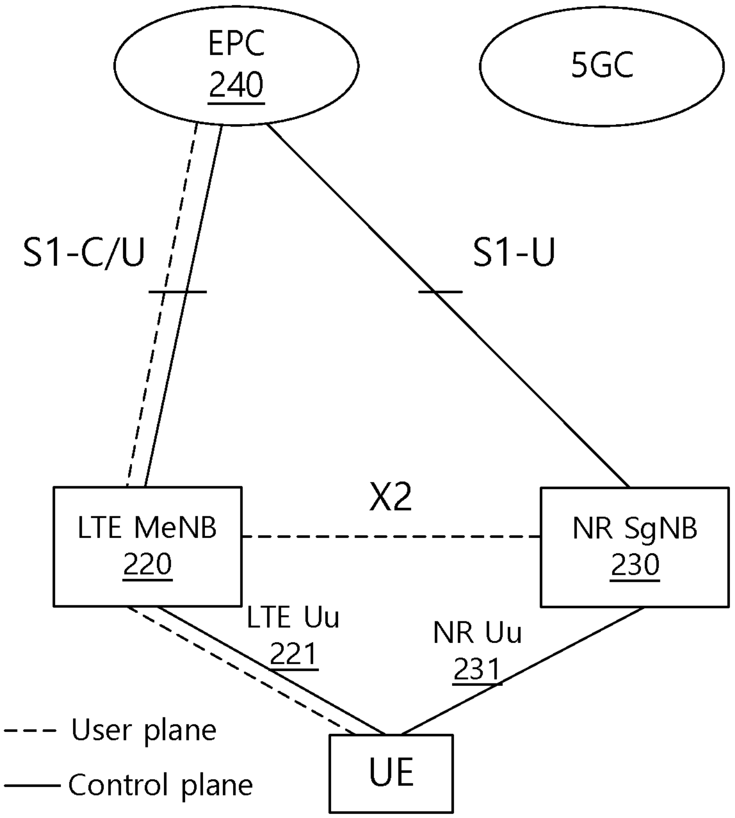
FIG. 2 is a schematic block diagram illustrating E-UTRAN-NR Dual Connectivity.
Figure 3:
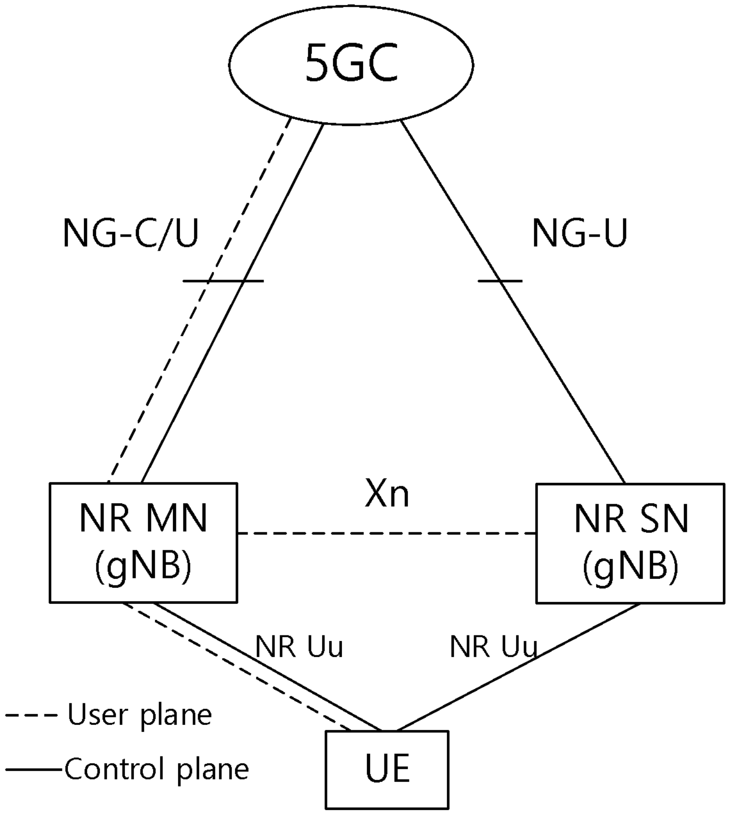
FIG. 3 is a schematic block diagram illustrating a NR-DC, where both the master node controlling the MCG and the secondary node controlling the SCG are NR.
Figure 4:
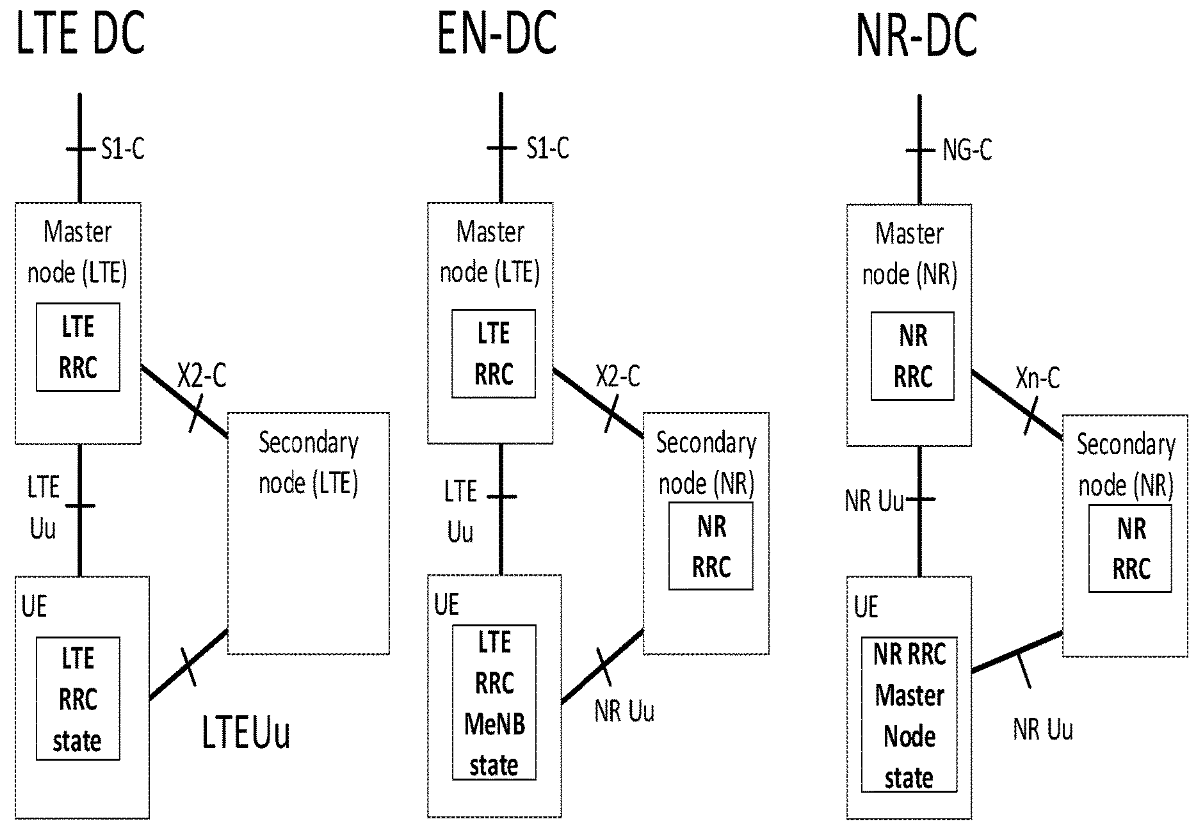
FIG. 4 is a schematic block diagram illustrating Control Plane architecture for Dual Connectivity in LTE DC, EN-DC and NR-DC.
Figure 5:
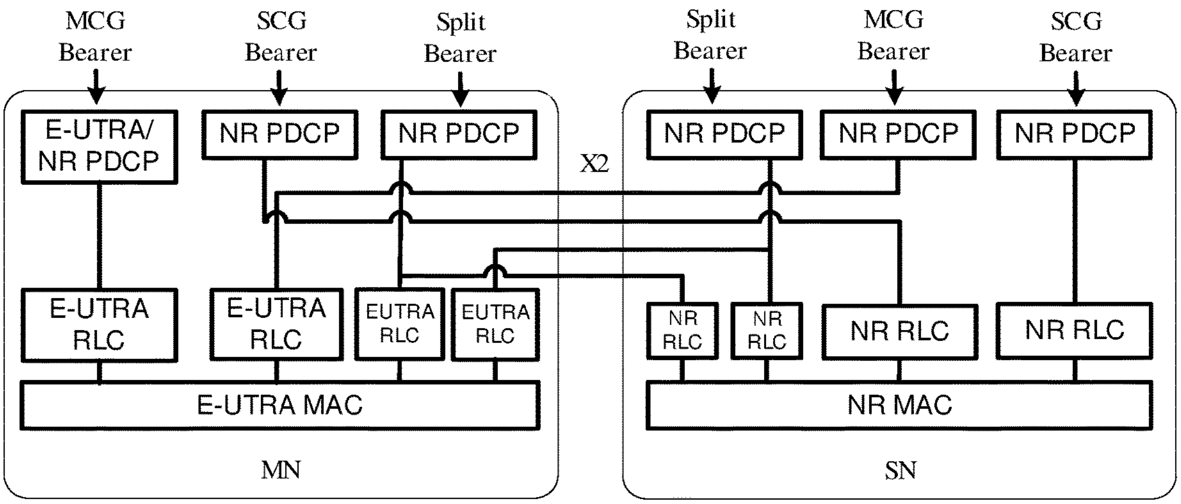
FIG. 5 is a schematic block diagram illustrating network side protocol termination options for MCG, SCG and split DRBs in MR-DC with EPC (EN-DC)
Figure 6:
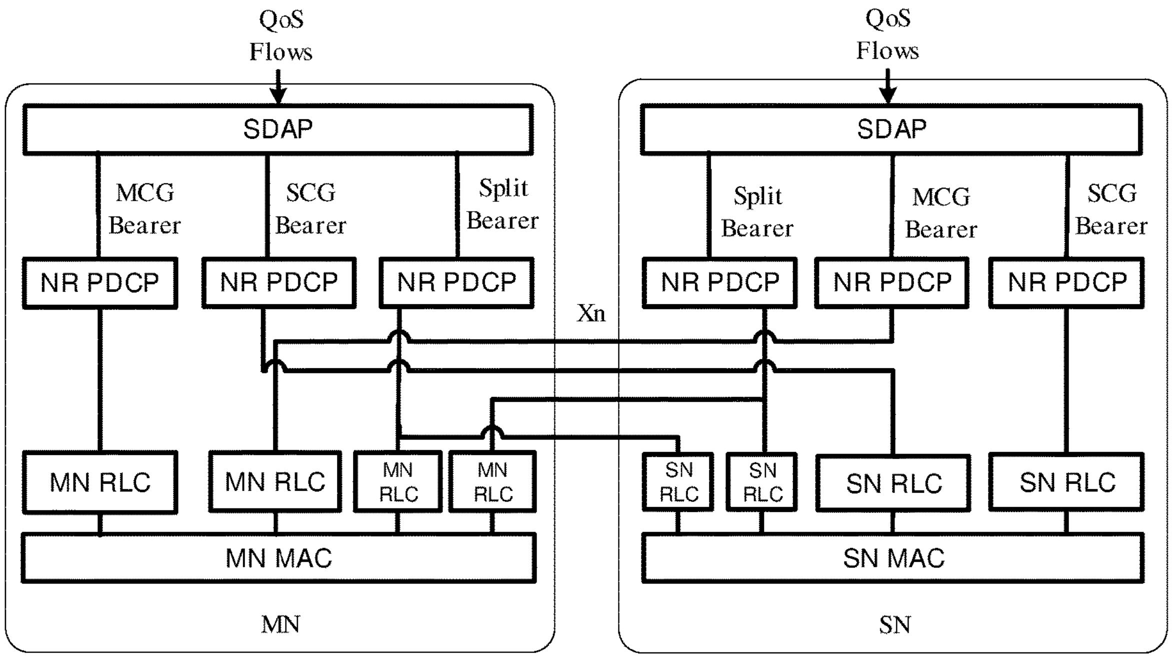
FIG. 6 is a schematic block diagram illustrating network side protocol termination options for MCG, SCG and split DRBs in MR-DC with 5GC (NGEN-DC, NE-DC and NR-DC)
Figure 7:
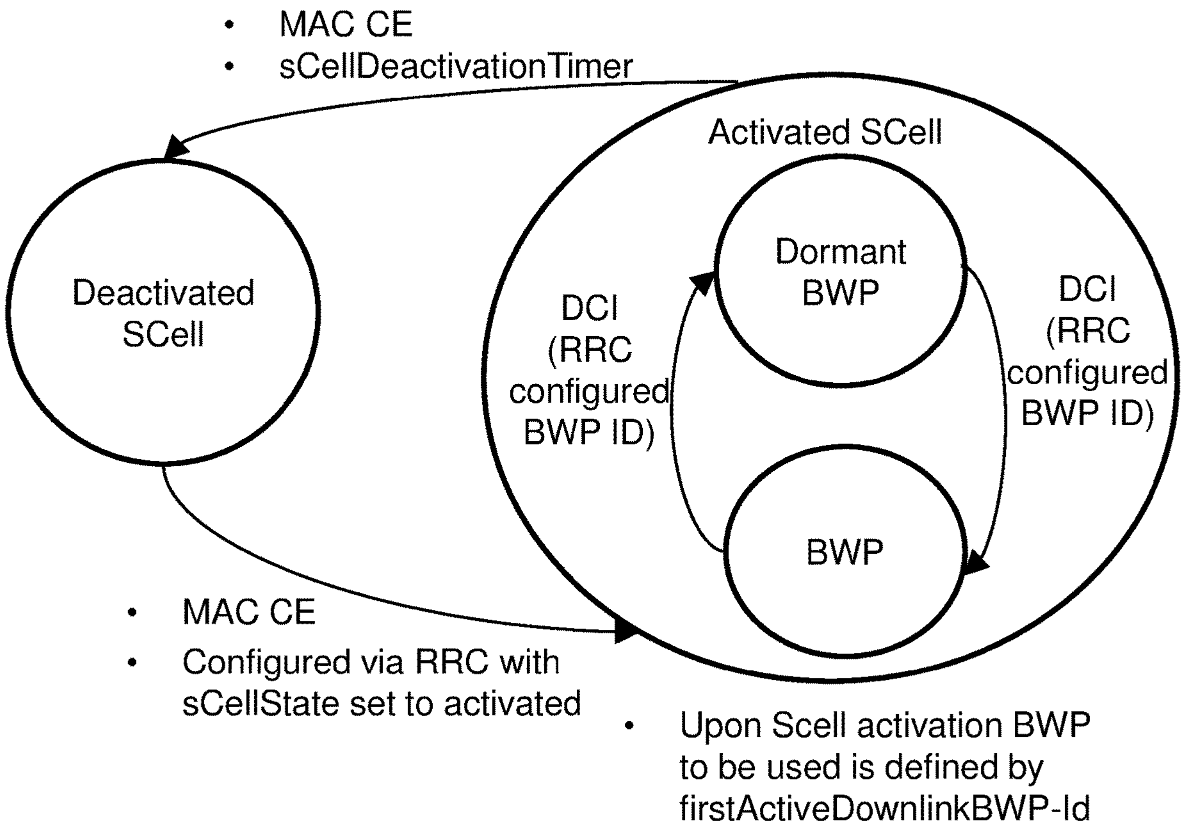
FIG. 7 is a schematic block diagram illustrating dormancy like behavior for SCells in NR.

The first and second network nodes 1211, 1212 may each be either a master node (MN) having a master cell group MCG, or a secondary node (SN) having a secondary cell group SCG, respectively, as shown in FIG. 1.

The description herein describes terms like SCG and PSCell, as one of the cells associated with the SCG. That can be for example a PSCell as defined in NR specifications e.g. RRC TS 38.331, defined as a Special Cell (SpCell) of the SCG, or a Primary SCG Cell (PSCell), as follows:

Secondary Cell Group: For a UE configured with dual connectivity, the subset of serving cells comprising of the PSCell and zero or more secondary cells (SCells).

Special Cell: For Dual Connectivity operation the term Special Cell refers to the PCell of the MCG or the PSCell of the SCG, otherwise the term Special Cell refers to the PCell.

Primary SCG Cell (PSCell): For dual connectivity operation, the SCG cell in which the UE performs random access when performing the Reconfiguration with Sync procedure.

For the sake of brevity, the description herein mostly refers and shows examples wherein the second cell group is a Secondary Cell Group (SCG) that is deactivated or suspended or in power saving mode of operation, for a UE configured with Multi-Radio Dual Connectivity (MR-DC). However, the method is equally applicable for the case where the second cell group is a Master Cell Group (MCG) for a UE configured with Dual Connectivity (e.g. MR-DC), wherein the MCG could be suspended, while the SCG is operating in normal mode.

The description herein describes that when the second cell group is deactivated e.g. SCG becomes deactivated upon reception of an indication from the network node, the UE stops monitoring PDCCH on the SCG cells, i.e. stop monitoring PDCCH of the PSCell and of the SCells of the SCG. Solutions are mainly described using as an example a second cell group that is a Secondary Cell Group that the UE configured with MR-DC is configured with; and, the SCG being deactivated mode of operation at the UE when the UE perform the actions disclosed in the method. However, the method is also applicable for the case one assumes that the second cell group is a Master Cell Group (MCG) that is deactivated, so that the UE stops monitoring PDCCH on the MCG and continues monitoring PDCCH on the SCG.

Correspondingly, the description herein mostly refers and shows examples wherein the first cell group is a Master Cell Group (MCG) for a UE configured with Multi-Radio Dual Connectivity (MR-DC). However, the method is equally applicable for the case where the first cell group is a Secondary Cell Group (SCG) that is deactivated or suspended or in power saving mode of operation, for a UE configured with Multi-Radio Dual Connectivity (MR-DC).

Figure 9:
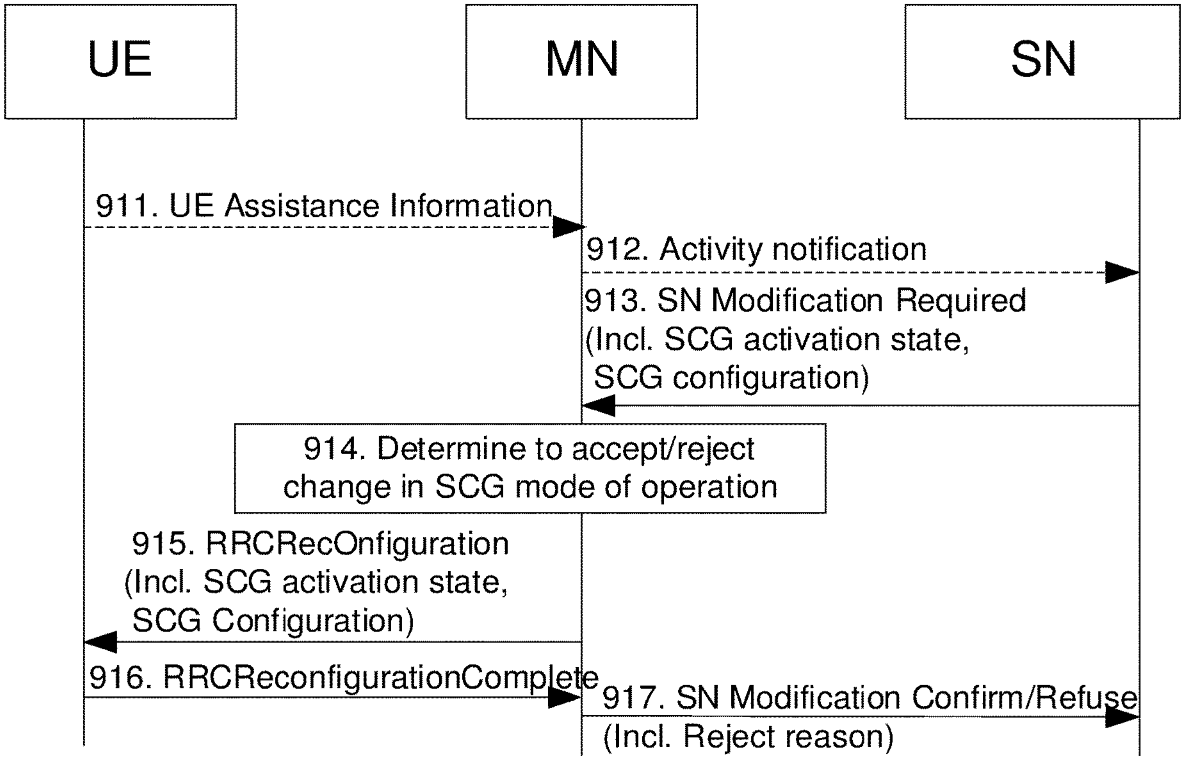
FIG. 9 is a signal flow chart illustrating an example embodiment of a method performed by a first network node according to embodiments herein.

According to embodiments herein a method performed by a first network node 811, e.g. a MN or a SN is provided for handling SCG operation mode change in the wireless communication network 800. The method will be described in detail with reference to FIG. 9, where an SCG activation/deactivation is initiated by a SN and the actions or steps performed by the first network node 811 are illustrated. The method comprises the following actions which action may be performed in any suitable order.

Action 911

This action is optional. The MN, i.e. the first network node 811, may receive a UE Assistance Information message from a UE, e.g. the first communication device 830. This message contains information that the UE wants to relay to the network node for information about the UE status. This message may contain assistance information about e.g. UE overheating, UE power saving. Information related to UE power saving may be max aggregated bandwidth, max number of component carriers, max number of MIMO layers, etc.

Action 912

This action is optional. The first network node 811 may transmit an ACTIVITY NOTIFICATION message to a SN, e.g. the second network node 812. This message contains information that there is user plane traffic on a certain session or that there is absence of user plane traffic on a certain session.

Action 913

The first network node 811 receives a request from the second network node 812 e.g., SN or MN, for change of mode of operation of the SCG.

The request may be S-NODE MODIFICATION REQUIRED with a request of activated or deactivated SCG.

The request may be S-NODE MODIFICATION REQUEST with a request of activated or deactivated SCG.

In other words, the request includes an indication of the change of mode of operation for the SCG that the second network node 812 proposes e.g. deactivate or activate SCG.

According to some embodiments herein, the second network node 812 may request the first network node 811 to change an SCG in deactivated mode to activated mode of operation.

According to some embodiments herein, the second network node 812 may request the first network node 811 to change an SCG in activated mode to deactivated mode of operation.

Action 914

The first network node 811 determines based on e.g. received UE assistance information or current UE traffic situation, etc. whether to accept or reject the request for change in the SCG mode of operation.

Action 915

If the change in SCG configuration and/or change of SCG mode of operation is accepted, the first network node 811 transmits to the UE a message including a reconfiguration or command to change the SCG configuration and/or mode of operation of the SCG.

Action 916

The first network node 811 receives response from the UE, e.g. an RRC Reconfiguration Complete message.

If the changes in SCG configuration and SCG mode of operation are not accepted, the above Actions 915 and 916 will not be performed, the first network node 811 performs instead the following actions. If the change in SCG configuration is accepted, but not the change in the SCG mode of operation, the first network node 811 performs the above Actions 915 and 916 and further performs the following actions.

Action 917

The first network node 811 transmits a response to the second network node 812 e.g., SN or MN, where the change of the SCG mode is accepted or rejected.

In one alternative, the first network node 811 does not accept the requested change of SCG mode of operation, but may accept other changes to the SCG configuration. In this case, the rejection of requested mode of operation may be indicated by the first network node 811 transmitting an acknowledge message, e.g. S-NODE MODIFICATION CONFIRM or S-NODE MODIFICATION REQUEST ACKNOWLEDGE including an indication that the change of SCG mode of operation is rejected and the reason for the rejection, e.g., UE overheating, UE power saving preference, expected new data, etc.

In another alternative, the first network node 811 does not accept the requested change of SCG mode of operation nor any other change to the SCG configuration. In this case, the rejection is indicated by the first network node 811 transmitting an S-NODE MODIFICATION REFUSE or S-NODE MODIFICATION REQUEST REJECT message. Possibly this may be indicated by a new cause value or multiple cause values in the message, e.g., UE overheating, UE power saving preference, expected new data, etc. In addition, this could indicate that the reason for not accepting the SCG configuration was due to not accepting a change of mode of operation i.e. that may indicate that if the second network node 812 sends another S-NODE MODIFICATION REQUIRED or S-NODE MODIFICATION REQUEST with a different SCG mode of operation that could be accepted.

Further examples of cause values at rejection of an activation may be e.g. lack of resources, UE out of coverage of the PSCell/SCG, etc. Further examples of cause values at rejection of an deactivation may be e.g. the network node does not expect much data and is soon releasing and/or inactivating/suspending the UE that may include an indication to release resources and/or suspend the resources etc.

Figure 10:
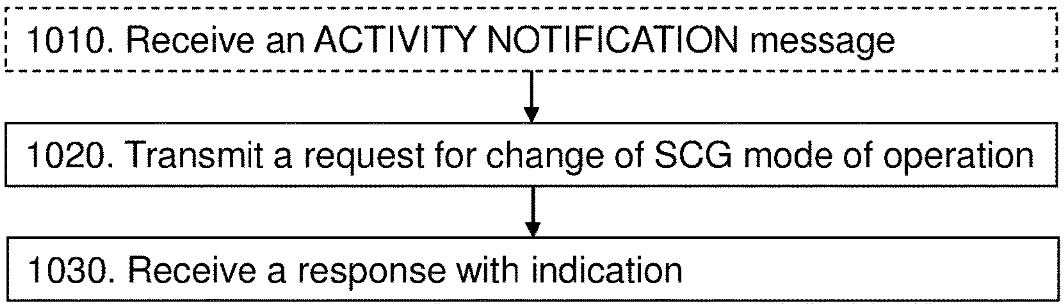
FIG. 10 is a flow chart illustrating an example embodiment of a method performed by a second network node according to embodiments herein.

According to embodiments herein a method performed by a second network node 812, e.g. a MN or a SN is provided for handling SCG operation mode change in the wireless communication network 800. The method will be described in detail with reference to FIG. 10, where an SCG activation/deactivation is initiated by a SN e.g. the second network node 811 and the actions or steps performed by the second network node 812 are illustrated. The method comprises the following actions which action may be performed in any suitable order.

Action 1010

This action is optional. The second network node 812 may receive an ACTIVITY NOTIFICATION message from the first network node 811. The second network node 812 may determine to change the mode of operation of the Secondary cell group (SCG) configuration e.g. based on a received ACTIVITY NOTIFICATION, based on measurement reports received from the UE and/or further input like traffic demands, e.g. deactivated to activated or activated to deactivated.

Action 1020

The second network node 812 transmits a request e.g. an SN Modification Request to a first network node 811 for a change of SCG mode of operation, from activated to deactivated or from deactivated to activated.

Action 1030

The second network node 812 receives a response from the first network node 811 where the modification of the mode of operation of the SCG may be accepted or rejected.

In one alternative, the second network node 812 may receive a response from the first network node 811 where the modification of the mode of operation of the SCG is rejected while other modifications of the SCG may be accepted. The rejection reason of the change of the operation mode is indicated in an acknowledge message, e.g. S-NODE MODIFICATION CONFIRM or S-NODE MODIFICATION REQUEST ACKNOWLEDGE including an indication that the change of SCG mode of operation is rejected and the reason for the rejection, e.g., UE overheating, UE power saving preference, expected new data, and etc.

In another alternative, the second network node 812 may receive a response from the first network node 811 where the modification of the mode of operation of the SCG is rejected. The rejection may be indicated in S-NODE MODIFICATION REFUSE or S-NODE MODIFICATION REQUEST REJECT, possibly together with a new cause value or multiple cause values, e.g., UE overheating, UE power saving preference, expected new data, etc.

Further examples of cause values at rejection of an activation may be e.g. lack of resources, UE out of coverage of the PSCell/SCG, or other. Further examples of cause values at rejection of an deactivation may be e.g. the network node does not expect much data and is soon releasing and/or inactivating/suspending the UE, that may include an indication to release resources and/or suspend the resources.

Figure 11:
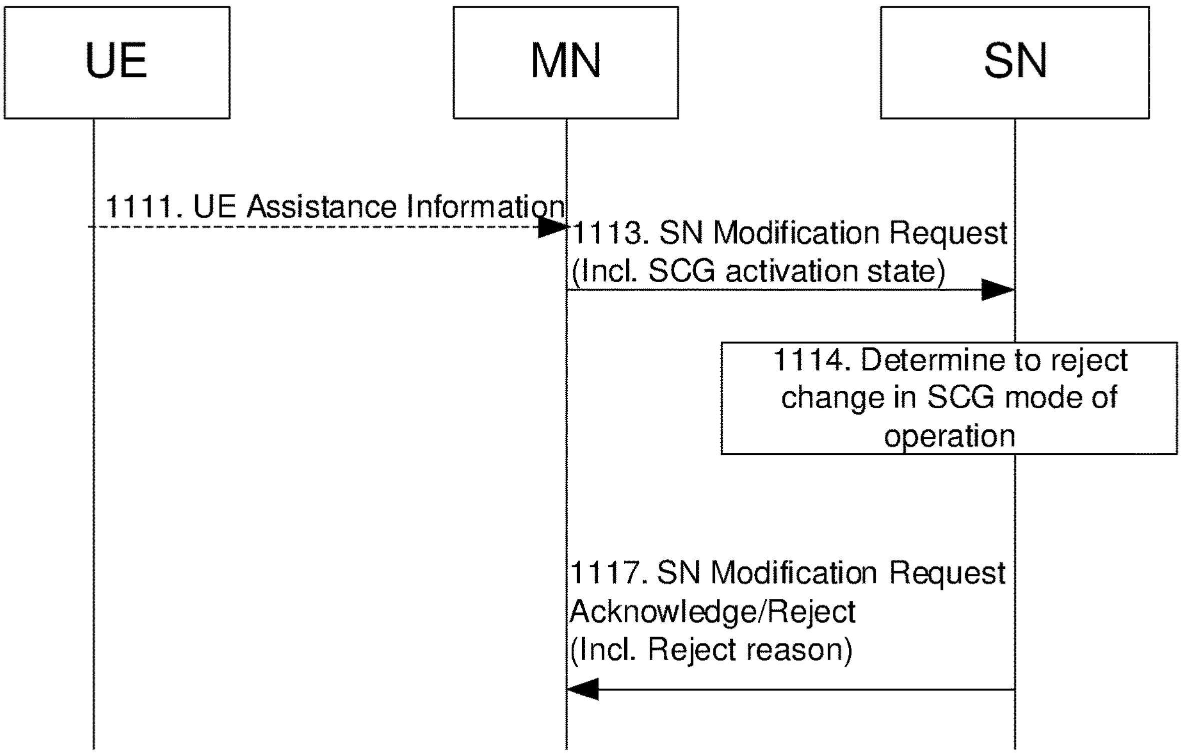
FIG. 11 is a signal flow chart illustrating another example according to embodiments herein.

The methods described above with respect to the first and second network node 811, 812 for handling SCG operation mode change is assumed that the SCG activation/deactivation is initiated by a SN. However the methods described above may equally apply to the situation where the SCG activation/deactivation is initiated by a MN. FIG. 11 shows such an example where an SCG activation/deactivation is initiated by the MN, and the actions performed in the MN and SN when changes in SCG configuration and mode of operation are not accepted. The Actions 1111, 1113, 1114, 1117 are corresponding to the Actions 911, 913, 914, 917 shown in FIG. 9 and described above.

According to embodiments herein a method performed by a communication device 830 is provided for handling SCG operation mode change in the wireless communication network 800. The communication device 830 sends UE assistance information to the MN. The communication device 830 receives a reconfiguration or command from an MN for change SCG configuration and/or change of SCG mode of operation, e.g. change from activated to deactivated or from deactivated to activated and sends a response to the MN e.g. an RRC Reconfiguration Complete message etc.

Figure 12:
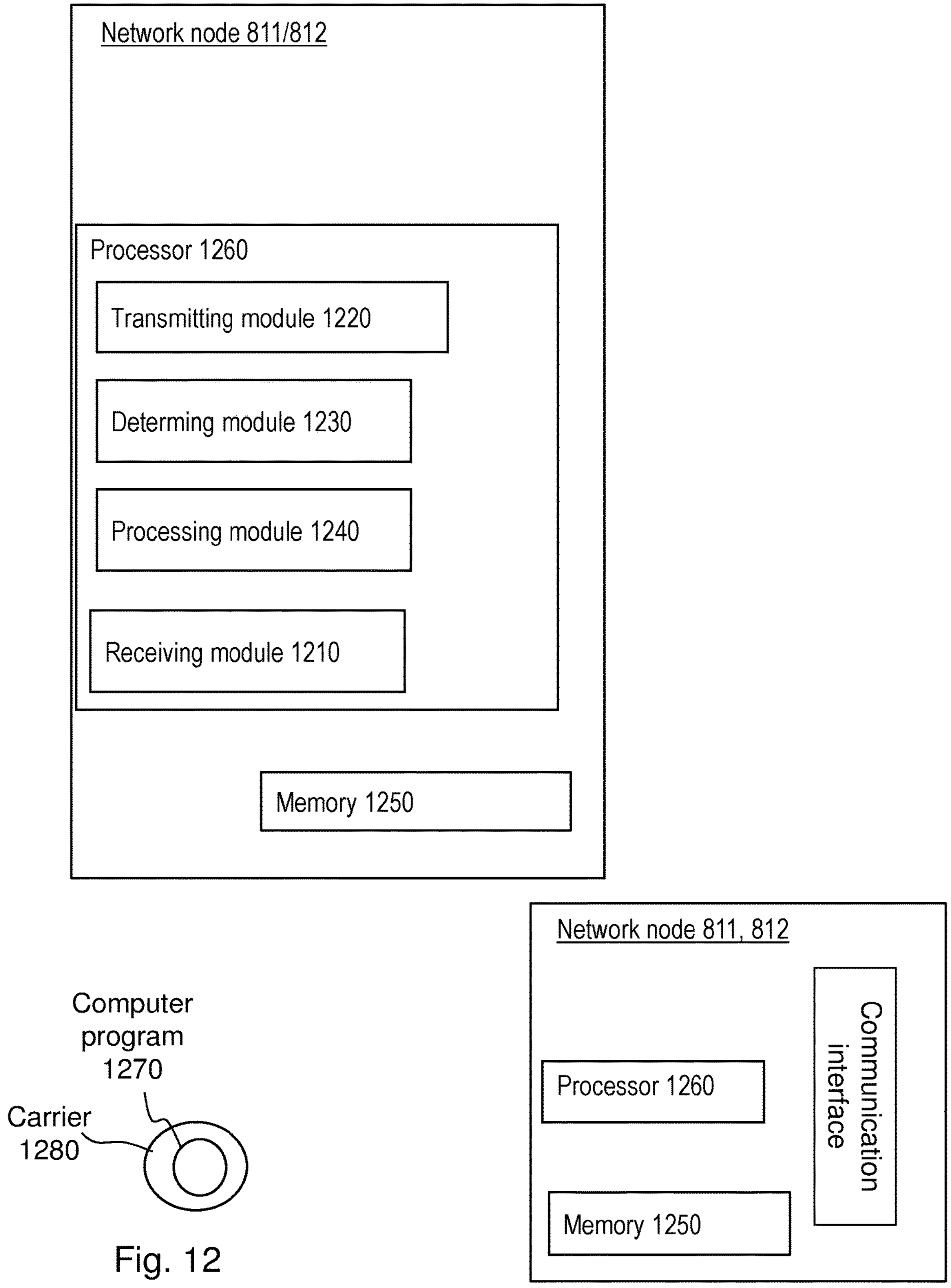
FIG. 12 is a schematic block diagram illustrating an example embodiment of a communication device.

To perform the method in the first/second network node 811/812, the first/second network node 811/812 comprises modules as shown in FIG. 12. The first/second network node 811/812 comprises a receiving module 1210, a transmitting module 1220, a determining module 1230, a processing module 1240, a memory 1250 etc.

The first/second network node 811/812 is configured to perform any one of the Actions 911-917, 1010-1030 described above.

The method according to embodiments herein may be implemented through one or more processors, such as the processor 1260 in the network node 811/812 together with computer program code for performing the functions and actions of the embodiments herein. The program code mentioned above may also be provided as a computer program product, for instance in the form of computer readable medium or a data carrier 1280 carrying computer program code 1270, as shown in FIG. 12, for performing the embodiments herein when being loaded into the network node 811/812. One such carrier may be in the form of a CD ROM disc. It is however feasible with other data carriers such as a memory stick. The computer program code may furthermore be provided as pure program code on a server or a cloud and downloaded to the network node 811/812.

Some example embodiments are listed in the following:

Embodiment 1: A method performed by a first network node 811 for handling SCG operation mode change in the wireless communication network 800, the method comprising:

Receiving a request from a second network node for change of SCG operation mode;

Determining whether to accept or reject the request for change of the SCG operation mode; and Transmitting a response to the second network node with an indication indicating a rejection reason if it is determined to reject the request for change of the SCG operation mode.

Embodiment 2: A method performed by a second network node 812 for handling SCG operation mode change in the wireless communication network 800, the method comprising:

Transmitting a request to a first network node for change of SCG operation mode;

Receiving a response from the first network node with an indication indicating a rejection reason if it is determined by the first network node to reject the request for change of the SCG operation mode.

The invention claimed is:

1. A method performed in a first network node for handling an operation mode change of a second network node for a communication device in a wireless communication network, wherein the communication device is configured with multi-radio dual connectivity (MR-DC) with the first network node having a first cell group and the second network node having a second cell group, the method comprising:

receiving a request from the second network node for a change of an operation mode of the second cell group and a change of a configuration of the second cell group;

determining whether to accept or reject the change of the operation mode and whether to accept or reject the change of the configuration; and transmitting a response to the second network node with an indication indicating a rejection reason, if it is determined to reject the change of the operation mode, wherein transmitting the response to the second network node with the indication is performed by transmitting an acknowledge message to the second network node including an indication indicating the change of the operation mode is rejected and the rejection reason, if it is determined that the change of the operation mode is rejected, but the change of the configuration of the second cell group is accepted.

2. The method according to claim 1, wherein the request for the change of the operation mode of the second cell group comprises an indication indicating the change of the operation mode is a change from a deactivated mode to an activated mode or a change from the activated mode to the deactivated mode for the second cell group.

3. The method according to claim 1, wherein transmitting the response to the second network node with the indication is performed by transmitting a reject or refuse message including a cause value or multiple cause values to the second network node, if it is determined that the requested change of the operation mode and any other changes requested by the request to the configuration of the second cell group are not accepted.

4. The method according to claim 3, wherein the rejection reason for the change of the configuration of the second cell group is due to not accepting the change of the operation mode of the second cell group.

5. The method according to claim 1 further comprising:

receiving an assistance information message from the communication device, wherein the assistance information message comprises information on a status of the communication device.

6. The method according to claim 5, wherein the status of the communication device comprises any one of overheating and power saving.

7. The method according to claim 5, wherein determining whether to accept or reject the change of the operation mode and/or the change of the configuration is based on the assistance information or a traffic situation of the communication device.

8. The method according to claim 1, wherein the first network node is operating as a Master Node (MN) and the second network node is operating as a Secondary Node (SN) for the communication device configured with MR-DC with a master cell group (MSG) and a secondary cell group (SCG).

9. The method according to claim 1, wherein the first network node is operating as a Secondary Node (SN) and the second network node is operating as a Master Node (MN) for the communication device configured with MR-DC with a master cell group (MSG) and a secondary cell group (SCG).

10. The method according to claim 1, wherein the rejection reason for a change from a deactivated mode to an activated mode is any one of the following:

a) overheating of the communication device;

b) power saving preference of the communication device;

c) lack of resources;

d) the communication device is out of a coverage of the second cell group.

11. The method according to claim 1, wherein the rejection reason for a change from an activated mode to a deactivated mode is any one of the following:

a) new data is expected;

b) the second network node is soon releasing and/or inactivating/suspending.

12. A method performed in a second network node for handling an operation mode change for a communication device in a wireless communication network, wherein the communication device is configured with multi-radio dual connectivity (MR-DC) with a first network node having a first cell group and the second network node having a second cell group, the method comprising:

transmitting a request to the first network node for a change of an operation mode of the second cell group and a change of a configuration of the second cell group; and receiving a response from the first network node with an indication indicating a rejection reason, if it is determined by the first network node that the request for the change of the operation mode is rejected, wherein the response is received as an acknowledge message from the first network node including an indication indicating the change of the operation mode is rejected and the rejection reason, if it is determined by the first network node that the requested change of the operation mode is rejected, but the change of the configuration of the second cell group is accepted.

13. The method according to claim 12, wherein the rejection reason is indicated in a reject or refuse message received from the first network node including a cause value or multiple cause values, if it is determined by the first network node that the requested change of the operation mode and any other changes to the configuration of the second cell group requested by the request are not accepted.

14. A first network node for handling an operation mode change of a second network node for a communication device in a wireless communication network, wherein the communication device is configured with multi-radio dual connectivity (MR-DC) with the first network node having a first cell group and the second network node having a second cell group, the first network node comprising:

a processor and a memory, said memory containing computer program code executable by the processor whereby the first network node is configured to:

receive a request from the second network node for a change of an operation mode of the second cell group and a change of a configuration of the second cell group;

determine whether to accept or reject the change of the operation mode and whether to accept or reject the change of the configuration; and transmit a response to the second network node with an indication indicating a rejection reason, if it is determined to reject the change of the operation mode, wherein the first network node is configured to transmit the response to the second network node with the indication by transmitting an acknowledge message to the second network node including an indication indicating the change of the operation mode is rejected and the rejection reason, if it is determined that the change of the operation mode is rejected, but the change of the configuration of the second cell group is accepted.

15. A second network node for handling an operation mode change for a communication device in a wireless communication network, wherein the communication device is configured with multi-radio dual connectivity (MR-DC) with a first network node having a first cell group and the second network node having a second cell group, the second network node comprising:

a processor and a memory, said memory containing computer program code executable by the processor whereby the second network node is configured to:

transmit a request to the first network node for a change of an operation mode of the second cell group and a change of a configuration of the second cell group; and receive a response from the first network node with an indication indicating a rejection reason, if it is determined by the first network node that the request for the change of the operation mode is rejected, wherein the response is received as an acknowledge message from the first network node including an indication indicating the change of the operation mode is rejected and the rejection reason, if it is determined by the first network node that the requested change of the operation mode is rejected, but the change of the configuration of the second cell group is accepted.

16. A method for handling an operation mode change for a communication device in a wireless communication network, wherein the communication device is configured with multi-radio dual connectivity (MR-DC) with a first network node having a first cell group and a second network node having a second cell group, the method comprising:

transmitting a request by the second network node to the first network node for a change of an operation mode of the second cell group and a change of a configuration of the second cell group;

receiving the request by the first network node from the second network node;

determining by the first network node whether to accept or reject the request for the change of the operation mode whether to accept or reject the change of the configuration; and transmitting by the first network node a response to the second network node with an indication indicating a rejection reason, if it is determined to reject the request for the change of the operation mode, wherein transmitting the response to the second network node with the indication is performed by transmitting an acknowledge message to the second network node including an indication indicating the change of the operation mode is rejected and the rejection reason, if it is determined that the change of the operation mode is rejected, but the change of the configuration of the second cell group is accepted.

17. A communication system for handling an operation mode change for a communication device in a wireless communication network, the system comprising:

a first network node having a first cell group, and a second network node having a second cell group, the second network node configured to transmit a request to the first network node for a change of an operation mode of the second cell group and a change of a configuration of the second cell group, wherein the communication device is configured with multi-radio dual connectivity (MR-DC) with the first network node and the second network node, wherein the first network node is configured to:

receive the request from the second network node;

determine whether to accept or reject the request for the change of the operation mode whether to accept or reject the change of the configuration; and transmit a response to the second network node with an indication indicating a rejection reason, if it is determined to reject the request for the change of the operation mode, wherein the response is transmitted to the second network node with the indication by transmitting an acknowledge message to the second network node including an indication indicating the change of the operation mode is rejected and the rejection reason, if it is determined that the change of the operation mode is rejected, but the change of the configuration of the second cell group is accepted.

18. The method of claim 1, wherein said determining comprises determining to reject the change of the operation mode but to accept the change of the configuration, and wherein said transmitting comprises transmitting the acknowledge message that indicates the change of the operation mode is rejected but the change of the configuration is accepted, wherein the acknowledge message includes the indication indicating the change of the operation mode is rejected and the rejection reason.

19. The method of claim 12, wherein the response is received as the acknowledge message indicating the change of the operation mode is rejected but the change of the configuration is accepted, wherein the acknowledge message includes the indication indicating the change of the operation mode is rejected and the rejection reason.

20. The first network node of claim 14, said memory containing computer program code executable by the processor whereby the first network node is configured to determine to reject the change of the operation mode but to accept the change of the configuration, and to transmit the acknowledge message that indicates the change of the operation mode is rejected but the change of the configuration is accepted, wherein the acknowledge message includes the indication indicating the change of the operation mode is rejected and the rejection reason.

* * * * *